United States Patent [19]
Triantafyllos et al.

[11] Patent Number: 5,233,611
[45] Date of Patent: Aug. 3, 1993

[54] AUTOMATED FUNCTION TESTING OF APPLICATION PROGRAMS

[75] Inventors: George Triantafyllos, Vestal; William H. Shield, Binghamton, both of N.Y.

[73] Assignee: International Business Machines Corporation, Armonk, N.Y.

[21] Appl. No.: 570,256

[22] Filed: Aug. 20, 1990

[51] Int. Cl.⁵ .............................. G06F 11/00
[52] U.S. Cl. ..................... 371/16.1; 371/19
[58] Field of Search ................. 371/16.1, 19

[56] References Cited

U.S. PATENT DOCUMENTS

| | | | |
|---|---|---|---|
| 4,696,003 | 9/1987 | Kerr et al. | 371/19 |
| 4,803,683 | 2/1989 | Mori et al. | 371/19 |
| 4,847,751 | 2/1989 | Nakade et al. | 364/200 |
| 5,032,789 | 7/1991 | Firooz et al. | 371/22.1 X |

FOREIGN PATENT DOCUMENTS 0284111 9/1988 European Pat. Off.
1-12333 4/1989 Japan.

OTHER PUBLICATIONS

IBM TDB, Vol. 31, No. 12, May 1989 "Maintenance Assurance Test Controller On Line Stand-Alone Capability".

Primary Examiner—Robert W. Beausoliel, Jr.
Assistant Examiner—Allen M. Lo
Attorney, Agent, or Firm—Arthur J. Samodovitz

[57] ABSTRACT

A computer system utilizes a single computer to test the operability of an application which also runs on the same computer. The computer system comprises a processor and a multi-tasking operating system, which is able to execute programs asynchronously and independently of each other in logical environments called sessions. A test case program executes during a first session, and tests an applications program which executes in a second session on the same computer system independently of the test case. The test case program includes commands to input keystrokes to the application under test for processing by the application under test. A test program reads the keystroke and the command from the test case and packetizes the keystroke and command. The test program also runs during the first session. A communication program runs on the processor during a second session and communicates the packetized keystroke and command to the operating system for input to the application under test. The application under test then processes the keystroke and generates screen data. The communications program sends the screen data to the test program which analyzes it to determine if the application under test is operating properly.

4 Claims, 9 Drawing Sheets

FIG.13

AUTOMATED FUNCTION TESTING OF APPLICATION PROGRAMS

BACKGROUND OF THE INVENTION

The invention relates generally to computer test equipment, and deals more particularly with a computer based test tool which is used to automatically test application programs and associated hardware, for example, by sending keystrokes to simulate user input and analyzing displays resulting from the application program that processes the input.

It is important to determine that application programs and supporting hardware are working properly prior to actual use. For example, it is important to determine if an application program can successfully respond to a keyboard input by writing data into a proper memory location, and be able to read the data stored in the memory location. A manual technique for making these tests was previously known in which a person manually enters data through the keyboard under the control of an application program and designates the proper memory location for the data. Then, the person enters a command through the keyboard to read the data contained in the designated memory location and display the data on a computer screen. Then, the person compares the displayed results to the data previously entered to determine if the application program and hardware are working properly. This is an extremely time consuming process because there are many functions to be tested in each application program and many target memory locations.

Heretofore, IBM Corporation utilized an automated test system to automate the testing process for testing IBM's 4381 processor and IBM's 9370 processor and related application programs. The application programs include service processor application programs which are used by the customer to test the operability of the processor and other associated hardware. IBM's automated test system is a human operator simulator which mimics a person's interaction with a computer. It is able to automatically send commands to a host processor, read responses on the screen made by the host processor, and determine if those responses reflect correct operation of the processor. The person's interface to the system is through a test case program, i.e., a program that compares the specifications of a machine or program to the results obtained from operating the machine or executing the program. The test case can be written either in a C program language or a restructured extended executor language (REXX). Once a test case has been written and debugged, the possibility of inaccurate results or error due to the automated test system is minimal so that not only the speed of testing and human time savings is improved but also the reliability of the test. IBM's automated test system can execute the test without human supervision. Also, no alterations or modifications are required to the application program to permit testing.

This prior art IBM automated test system comprises two personal computers coupled together via communication and interface hardware within each personal computer. In practice, each of the personal computers comprises either an IBM XT personal computer or AT personal computer and DOS operating system. One of the personal computers is the device under test and executes the application program to be tested. This personal computer is also coupled to a host computer, and the aforesaid application program can be a service function to diagnose the host computer. The other personal computer is a driver and is the personal computer that controls and monitors the device under test personal computer. The driver is loaded with and executes (a) a test case program that functionally tests the device under test, and (b) an automated test system software which assists the test case program in carrying out tasks such as transmitting keystrokes to the device under test, which keystrokes are designated by the test case program, and screening information provided by the device under test in response to the keystroke inputs.

The aforesaid IBM automated test system executes in real mode, i.e. it sends data to and reads the physical display directly. As noted above, it requires two personal computers and additional interface and communication hardware within each personal computer. Also, the prior art IBM automated test system can only test one application program at a time.

Accordingly, a general object of the present invention is to provide automatic function testing without requiring an additional driver personal computer.

Another general object of the present invention is to provide automatic function testing without requiring special interface and communication hardware.

Another object of the present invention is to permit one test case to test two application programs (almost) simultaneously.

Another object of the present invention is to permit multiple test cases to test multiple applications concurrently.

Still another object of the present invention is to realize the foregoing objects without requiring adaptation or modification to the application program under test.

SUMMARY

The invention resides in a computer system and computer program product which utilizes a single computer to test the operability of an application which also runs on the same computer. The computer system comprises a processor for executing a test case which resides in a first session. The test case program includes a command to input a keystroke to the application under test for processing by the application under test. A test program reads the keystroke and the command from the test case and reformats the keystroke and command. The test program also resides in the first session. An operating system serves the processor and controls execution of the test case program, the application under test and the test program. A communication program runs on the processor, resides in a second session and communicates the reformatted keystrokes and command to the operating system for input to the application under test during the second session. The application under test then processes the keystroke and generates screen data. The test program (which resides in the first session) reads and analyzes the screen data to determine if the application under test is operating properly.

DETAILED DESCRIPTION OF THE PREFERRED EMBODIMENTS

Figure 1:
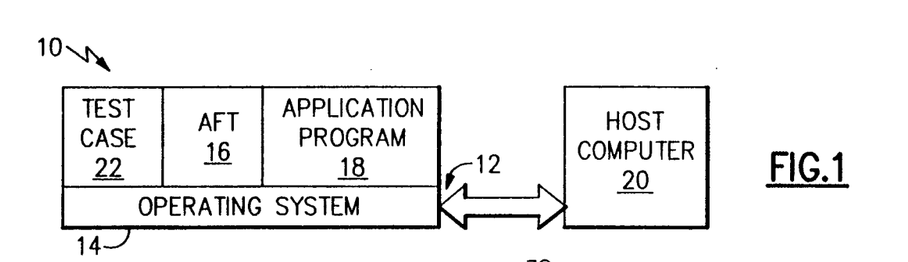
FIG. 1 is a high level block diagram of a computer system which includes an automated function tester according to the present invention.

Referring now to the present invention in detail wherein like reference numerals indicate like elements throughout the several views, FIG. 1 illustrates an automatic function testing system generally designated 10 according to the present invention. System 10 comprises a personal computer 12 which utilizes a multitasking operating system 14. The multi-tasking operating system can execute more than one program or parts of a singular program such that both programs or parts appear to be executed concurrently. By way of example, personal computer 12 comprises either an IBM AT personal computer or an IBM PS/2 (TM) personal computer, and operating system 14 comprises an IBM OS/2 (TM) operating system. During regular operation of system 10 and during testing, an application program 18 also runs on operating system 14. By way of example, application program 18 comprises host communication software for a host emulator function such as an IBM CP 78 emulator program to permit personal computer 12 to communicate with and access a host computer 20. During testing, a test case 22 is loaded into personal computer 12 to define the testing instances for an automated function test program 16. Once the test case 22 is loaded, automated function test program 16 implements the test cases by, for example, sending keystrokes to the application program 18 and analyzing a resultant display made by the application to determine if the application and personal computer are working properly. Test Program 16 can run without human intervention.

Figure 2:
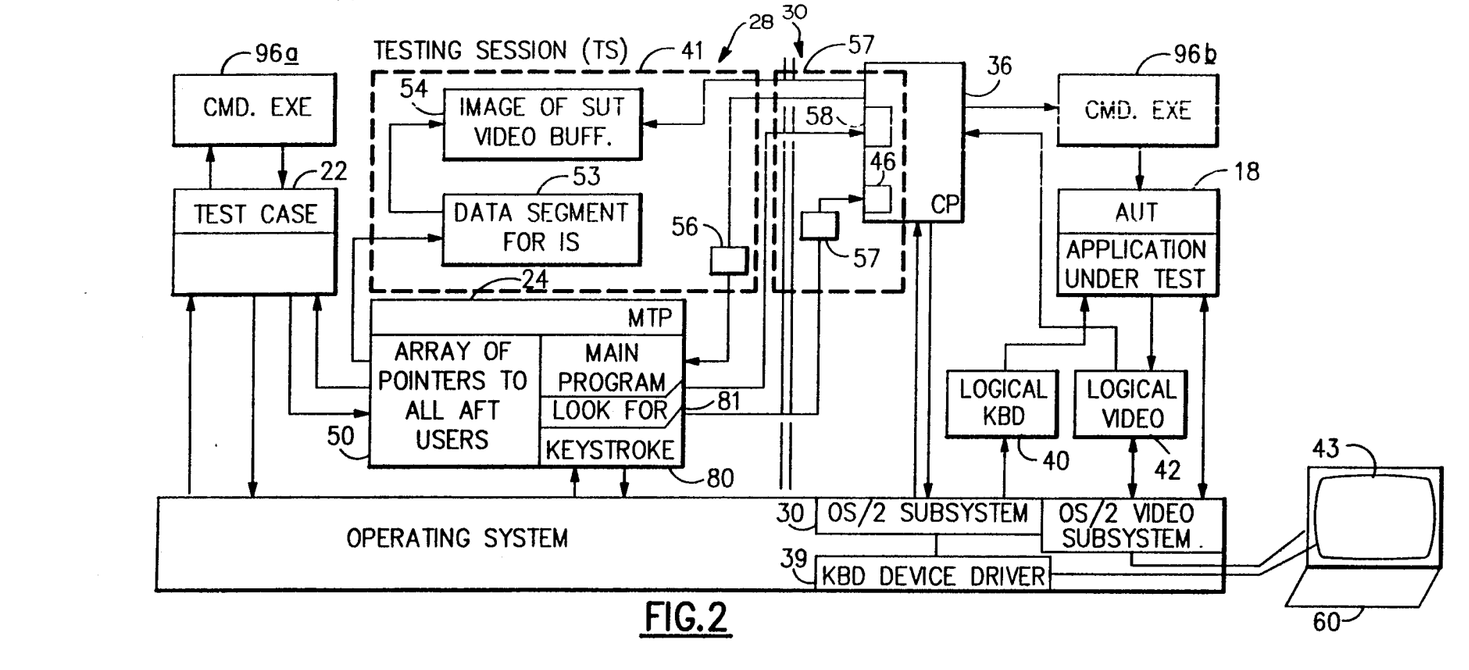
FIG. 2 is a lower level block diagram of components of the automated function tester of FIG. 1.

As illustrated in FIG. 2, system 10 requires two sessions of operating system 12 in order to implement automated function testing of application program 18. A "session" is a logical environment comprising a collection of resources such as memory which are stored by processes running in the same session. For example, if two processes run during the same session, they both share the same video buffer and the same keyboard buffer so they both can write to the same screen and read from the same keyboard buffer. The OS/2 operations system support up to sixteen sessions. Each session is independent of the other sessions, and processes run during one session are independent of processes run during the other sessions. In a first testing session 28, test case 22 and a main test program 34 of automated function test program 16 are run and main test program 34 transmits keystrokes identified by test case 22 for application program 18. A session under test 30 is created during initialization of the first testing session 28. Automated function test program 16 includes a communication program program 36 which is run during session 30 and is an interface between main test program 34 and application program 18. During session under test 30, the application program 18 processes the keystroke data transmitted to application 18 via the communication program 36 from the first testing session, (which is stored in a logical keyboard 40) and generates screen data for subsequent analysis by test case 22.

During the testing session 28, test program 34 reads and analyzes application program 18's screen data (obtained from logical video buffer 42) and reports the analysis to the test case, either "error" or ok". In addition to permitting testing with a single computer, the use of different sessions permits a user to observe both the test case and the program being tested. If the test case and the program under test were executed in the same session, input from the keyboard could go to either of the programs, and both programs would override the same screen 43 on personal computer 12.

Main test program 34 is built as a dynamic link library (independently of test case 22) which library in the illustrated embodiment, is a call/return interface that uses a program stack to pass parameters. Because main test program 34 is built as a dynamic link library, a test case can communicate with main test program 34 just as if main test program 34 were another routine linked to the test case module. To call main test program 34, test case 22 calls a function contained within main test program 34 and passes a pointer and data structure which contains all information that the function needs to carry out the task. Functions that require sending or receiving information from the application under test 18, write the appropriate command code in the shared memory 57, and signal communication program 36 to process it via the system semaphore 58. In response, communication program 36 carries out the request and responds back by writing a "done" message to semaphore 56. The following is a list of functions/commands supported by main test program 34 to serve test case 22 and participate in the interface to application 18:

| | |
|---|---|
| TAILBEGN | This command is a function routine. "Test Automation Interface Language Bein", which is implemented by main test program 34. This command instructs test program 34 to initialize the system, create the work space for the test program 34. Normally, this is this first command in a test case. This |

-continued

| | |
|---|---|
| | function also creates the session under test 30, if it detects that session 30 does not exist as a result of a previous call to tail begin and executes the communication program 36 which in turn executes the application under test. |
| CURSOR | This command returns the cursor position of the session under test. |
| KEYSTROKE | Sends a string of characters to the session under test. The function supports characters as well as combinations of all shift states followed by a key excludig the operating system "hot" keys. This function is invoked by test case 22, and the keystroke characters are received by application 18 as if the keystrokes emanated from a keyboard 60. |
| LOOKFOR | This command searches a specified window of the session under test screen 42 for a specific set of target strings indentified by field address on the screen. (There may be many sessions running in the system. Each one has a logical video buffer and programs that want to write data on the screen or write to their buffer. The user can switch to any session and view its logical video buffer on the screen). This function is invoked by test case 22. Logical video buffer 42 actually stores the screen contents, and is searched for the target string. If the targets are not on the screen. "lookfor" will keep searching the screen for a specified period of time. The function returns control to the test case if one of the targets is found or the time elapses. Lookfor is able to look for characters, color attributes or both. |
| MSGLOG | This command is "Message Log" and causes a message on a message file and displays it on the screen. This command is used by the test case to record problems found in the application under test and by test program 34 to record parameter errors in the test case. |
| PAUSE | This command halts program execution until the user enters some data on the keyboard. This function enables the user to enter data or alter parameters of the test case during run time. The function can receive input from the keyboard or from the system operator at a remote computer connected to the computer that executes the test via a Local Area Network (LAN). |
| RDSCR | This command is "Read Screen", and copies the session under test screen into a user specified buffer. |
| RESET | This function is used to reset the fields of a test automation interface language structure to their default values. |
| SAVESSR | This command is "Save Screen", and saves the exact screen image of the application under test on a disk file. |
| WHENEVER | This function is used to instruct main test program 34 to monitor an event on the session under test screen and signal the test case when is occurs. When the event occurs, test program executes a user written procedure that handles the event. |
| TAILEND | This command cleans up the work space for this test case and closes the interface between main test program 34 and communication program 36. Normally, this is the last command in a test case. |
| OpeNextSut | This function directs main test program 34 to create another session under test and execute communication program 36 in the session. The test case can now start up and test a second program. All sessions under test, including the one created by a call to TAILBEGN, are placed in a circular queue. The queue resides in data segment 50. |
| NextSUT | This function switches to the next session under test in the circular queue. |

-continued

| | |
|---|---|
| | when more than one are used. NextSUT can be invoked after a call to OpenNextSUT to switch to that session. Only one session under test can be active at any given time within the scope of a test case. |
| CloseNextSUT | This function closes a session under test that had been created by a call to OpeNextSUT. |

A "CMD.EXE" program 96a and 96b runs during sessions 28 and 30, respectively and is the command interpreter for the OS/2 operating system. The command interpreter is part of the OS/2 operating system and it is used to assist the user in executing operating system commands or application programs. Program 96 is used to enable a user to execute a test case. Program 96 B is used by the communication program to execute the application under test 18. For further details of the CMD.EXE program 96a, reference can be made to IBM OS/2 EE Version 1.2 Commands Reference pp. 3-27.

The automated function test program 16 also comprises a global data segment 50 which stores information such as the number of tests (pairs of testing sessions 28 and sessions under test 30) running at any time, an identification number for each test, and a pointer to a local data segment 41, for each pair of testing sessions. For any testing session, session under test pair, main test program 34 creates and maintains the following information structures:
  1) local data segment 53 (within shared memory 41) containing information such as the names of the test case and the application program being tested, handles i.e. pointers to the video image, 54, pointers to semaphores 46, 58, bookkeeping variables, information about the test case, etc;
  2) a memory buffer 54 for the screen image of the application program being tested;
  3) a system semaphore 56 which is used during communication with 36.

The code of main test program 34 is broken into specific functions, two of which—keystroke 80 and lookfor 81, are shown in FIG. 2. In the case of the keystroke function 80 invoked by the test case 22, test program 34 transmits a keystroke to application program 18 via communication program 36, a keyboard subsystem 30 and a logical keyboard buffer 40. Thus, the input appears to application program 18 as if the keystroke was entered via keyboard 60 (with control by a keyboard device driver 39). In the case of the "lookfor" function 81, main test program 34 transmits the screen field address to communication program 36, and communication program 36 fetches the field data from logical video buffer 42 and sends the data to buffer 54. Because communication program 36 is executed in the same session as application program 18, communication program 36 shares the same logical video buffer 42 and the same logical keyboard buffer 40 as application program 18.

When test case (program) 22 starts, main test program 34 creates testing session 30 and also initiates communication program 36. In response, communication program 36 loads and executes application program 18 asynchronously. Then, communication program 36 exchanges resource information with main test program 34. The communication program obtains access to a shared segment 41 created by main test program 34, which includes the video buffer 54, semaphores 56 that have been given a name when created by process main test program 34. The test program 34 obtains access to the shared segment 57 created by the communication program; shared segment 57 includes two semaphores 58, 46 and a "packet" structure 51. Shared segments are used for exchanging the large amounts of video data between video buffers 42 and 54. Once communication program 36 knows the name of that shared segment it can access it in both read and write mode.

Figure 3:
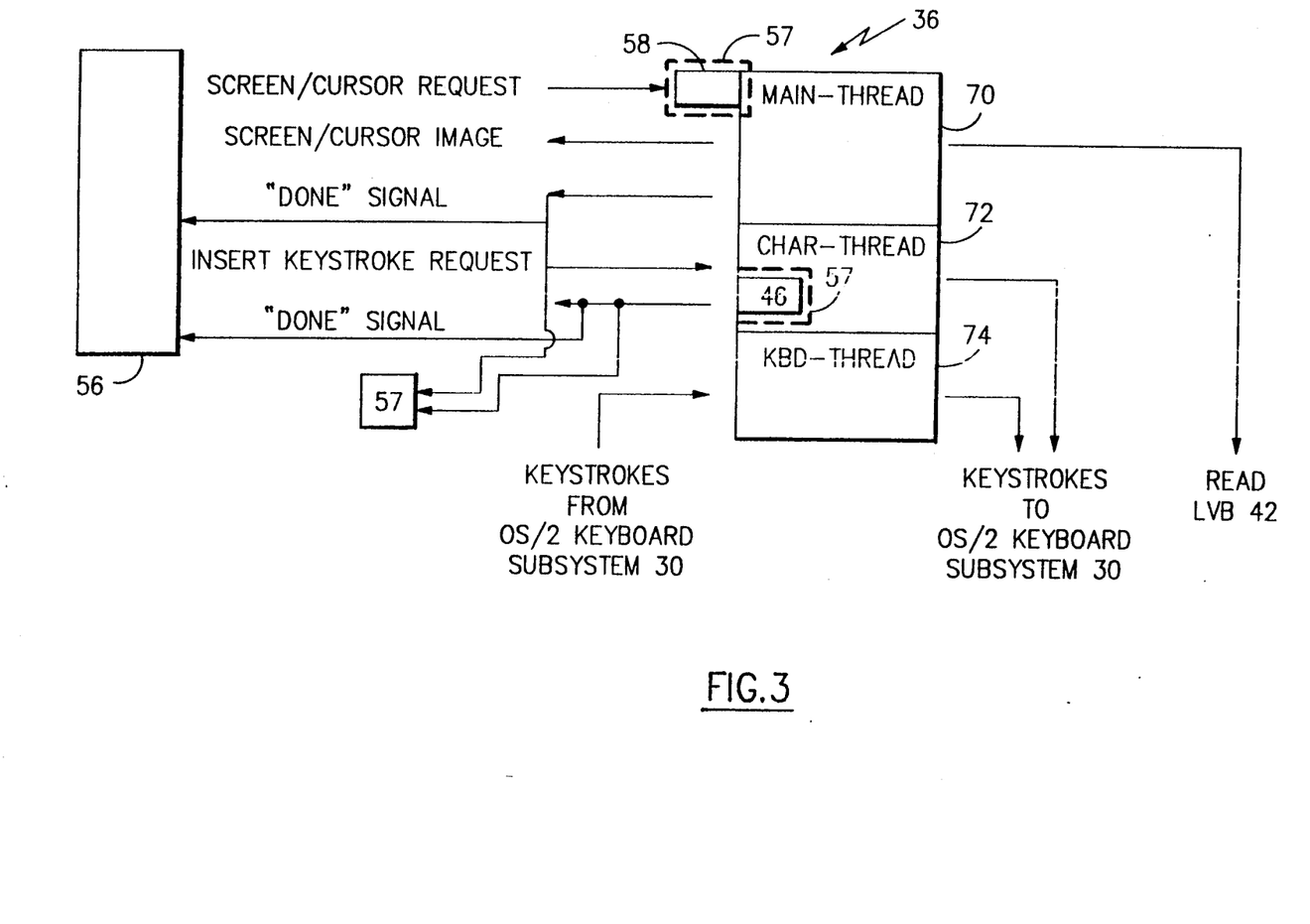
FIG. 3 is a block diagram illustrating three threads of a communication program within the automated function tester of FIG. 1.

FIG. 3 illustrates three threads, a main thread 70, a character thread 72 and a keyboard thread 74, and data flow of the communication program 36 in detail. The threads are executed almost concurrently in the multitasking environment.

The following is a list of all commands that main thread 70 can execute:

| | |
|---|---|
| BEGIN | This command opens the interface between main test program 34 and communication program 36, and gives communication program 36 access to test program 34 resources. This command is executed when a test case starts after another has finished. It should be noted that when a test case finishes, main test program 34 discards all work areas from memory but is does not destroy the session under test. This allows the tester to build a test case in small pieces and execute them in sequence. |
| END | This command closes all main test program 34 resources i.e. shared memories, queues, semaphores, etc. This command is normally executed just before a test case gives control to the operating system. |
| DATA | This command requests communication program 36 to copy the characters of logical video buffer 42 to video buffer 54. |
| ATTR | This command requests communication program 36 to copy the attributes of logical video buffer 42 to video buffer 54. |
| ALL | This command causes communication program 436 to copy both characters and attributes of logical video buffer 42 to the test program 34's shared segment. |
| DATA_RP | This command is th same as the DATA command, but it replaces the null characters (ASCII 0) found on the logical video buffer with the "space" character (ASCII 32). |
| ALL_RP | This command is the same as the ALL command but it replaces null characters with "spaces". |
| CURSOR | This command requests communication program 34 to report the cursor position of the application video test screen. |

Main thread 70 is requested and reads the video buffer 42 of application program 18 in the following manner:

1) Test case program 22 invokes a "RDSCR" (read screen) function of test program 34 specifying what part or field of the screen to be read, whether color attribute should be read, whether to replace the nulls with "spaces".
2) Test program 34 sends a "DATA" or "DATA-RP" command to shared segment 57 with the other required information, activates thread 70 via the semaphore 58 and then waits until the information is available.
3) Main thread 70 is activated and copies the requested screen information field by field, from logical video buffer 42 into video buffer 54 in shared memory 41 allocated specifically for this purpose.

4) Main thread 70 then sends a "complete" message to test program semaphore 56 and waits for another command from test case program 34.
5) Test program 34 reads the "complete" message from semaphore 56 and resumes activity.

At this time, test program 34 has access to an exact copy of the display of application program 18, and processes the display data. In the illustrated example, test program 34 compares the screen data to the input keystroke to determine if they are the same.

Keyboard thread 74 is registered with keyboard device driver 39 and provides access to a keyboard subsystem 30. Keyboard thread 74 monitors keystrokes coming from physical keyboard 60 via keyboard subsystem 30 which keystrokes are responsive to a display made by application program 18. Keyboard thread 74 executes two OS/2 operating system functions:

1) "Keyboard Monitor Read" which receives a keystroke from the OS/2 operating system keyboard subsystem 30; and
2) "Keyboard Monitor Write" which sends the keystroke back to the OS/2 operating system keyboard subsystem 30.

Keyboard thread 74 supports character thread 72 which is responsible for simulating keystrokes designated by a test case 22 call and provided by test program 34 for input to application program 18. The test case call is made to keystroke function 80 of test program 34 (FIG. 2) and specifies the characters to be sent to application program 18. In response, keystroke function 80 translates all characters one-by-one into "packets" which are similar in format to information that keyboard thread 74 receives from the OS/2 operating system (keyboard subsystem 30) after a keyboard entry on keyboard 60. Keystroke function 80 then stores the packet in packet structure 51 of the shared memory 57, and releases a semaphore 46 for which character thread 72 is waiting. This semaphore activates character thread 72 which then reads the packet from shared memory 57. Then, character thread 72 executes the aforesaid Keyboard Monitor Write Function which sends the packet to the operating system (keyboard subsystem 30). The operating system then processes the character packet as if it came from the keyboard 60. The operating system stores the character in logical keyboard buffer 42. Next, character thread 72 signals keystroke function 80 that the characters have been received by releasing semaphore 56, and then character thread 72 waits for the semaphore 46 to clear again so that keystroke function 80 can send the next packet.

By executing the foregoing Keyboard Monitor Write function, communication program 36 simulates a keystroke on physical keyboard 60. Afterwards, the operating system 14 and application 18 cannot distinguish between this simulated keystroke and the real keystroke entered through keyboard 60. Thus, the operating system processes the simulated keystroke (inserted packet) as a real keystroke and routes it to application 18 (or any other process in the session) that is waiting for keystrokes. For example, in this manner automated function test program 16 can control the application program 18 by means of inserting keystrokes into session under test 30.

FIGS. 4-9 illustrate data flows of three test program functions, the Keystroke, Read Screen and Lookfor functions. In these examples, test case 22 is written to verify that a word processor application under test 18 reads and displays characters correctly. The test case sends some keystrokes to the word processor and then reads display data (displayed on screen 43) to verify that the keystrokes which are sent are properly processed by the word processor application and appear on the screen and logical video buffer 42. The following assumptions have been made to support the programs represented by the FIGS. 4-9:

1. An initialization code (not shown) has created a test session—session under test pair, and initiated the word processor application to be tested in the session under test.
2. The word processor application is at a state where it can accept data from a keyboard and display it on the screen.
3. The word processor needs no more than two seconds to read and display the characters under any circumstances.

Figure 4:
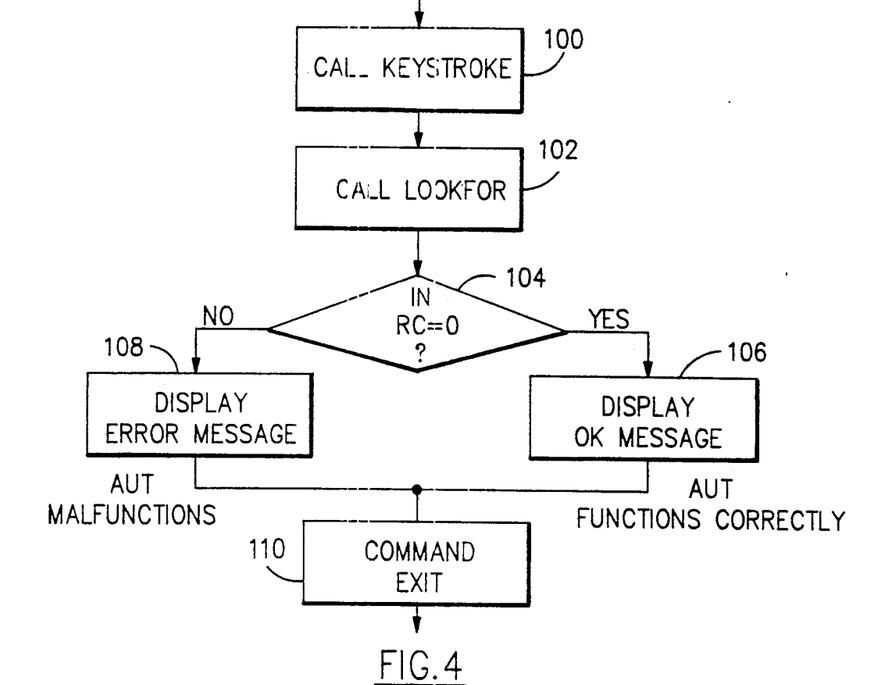
FIG. 4 is a flow chart of a test case program that can be run on the automated function tester of FIG. 1.
Figure 5:
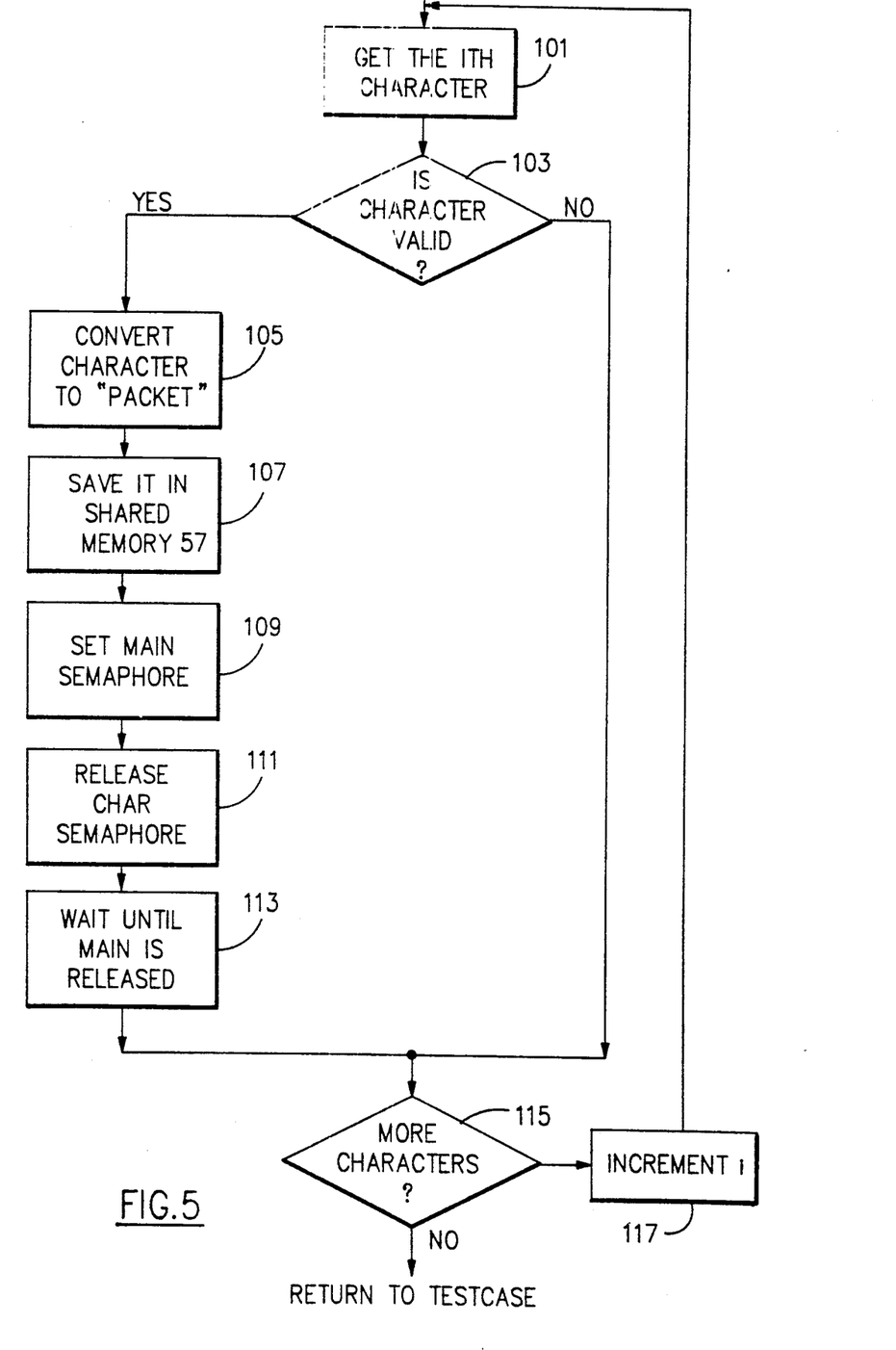
FIG. 5 is a flow chart of a portion of a test program which runs on the system of FIG. 1, and serves to transmit a keystroke to an application under test.

In step 100 of FIG. 4, test case 22 transmits a keystroke to test program 34 by designating the keystroke and invoking the Keystroke function. In response to the Keystroke function, test program 34 reads the character (step 101 of FIG. 5) and then determines if the character is valid (i.e. decision block 103). If the character from the test case 22 is valid, test program 34 converts the character to a "packet" which is a suitable form to transfer the keystroke information to communication program 36 (step 105), and then test program 34 stores the packet in location 51 in shared memory 57 (step 107). In the illustrated embodiment, the "packet" is a data structure which has the same form as that produced by keyboard subsystem 30 in response to an actual key press on keyboard 60. For the OS/2 operating system example, the packet comprises the keystroke in ASCII code. A "SCAN" code which is a number identifying which physical key was pressed (or is being mimicked in this case), the time that the keystroke is generated, a state of the character, a shift state which indicates whether a shift or other control key was pressed at the same time as the key, a keyboard handle that identifies which logical keyboard was used (in case there is more than one), etc. For further details of the form and content of the packet, reference can be made to "OS/2 Technical Reference" chapter 8, published by IBM Corp. of Armonk, N.Y., publication number 00F8879. Next, test program 34 sets a main semaphore 56 of test program 34 to enable the serialization of code executions of 34, 36, (step 109), and then releases a character semaphore 46 (step 111) for character thread 72 which is waiting (step 12 of FIG. 6). Next, test program 34 waits until its main semaphore 56 is released (step 113) to signal the completion of inserting the with character in logical keyboard 40 by 72. Test program 34 then repeats steps 101, 103, 105, 107, 109, 111, and 113 for all additional characters provided by test case 22 (decision block 115 and step 117).

Figure 6:
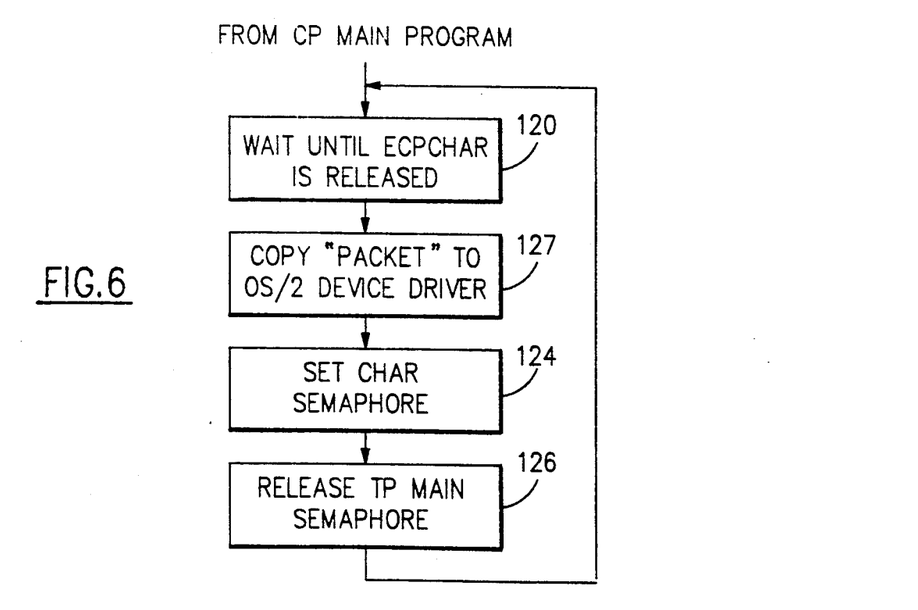
FIG. 6 is a flow chart of a character thread of the communication program of FIG. 3, which thread sends the keystroke of FIG. 5 to an operating system within the computer system of FIG. 1 for processing by the application under test.

The release character semaphore step 111 signals the character thread 72 of communication program 36 to process the character. As illustrated in FIG. 6 communication program 36 idles until the character semaphore is released in step 111 (step 120). Then, the character thread 72 sends the character provided by test program 34 in step 107 to the keyboard subsystem 30 (step 122) which stores it in logical keyboard buffer 40. Next, character thread 70 sets the character semaphore 46 (step 124), and releases the main semaphore 56 (step 126) of test program 34 to permit test program 34 to process the next function from test case 22, for example, receive the next character. Application 18 reads and processes the keystroke to yield screen data which is stored in logical video buffer 42 and displayed on screen 43 via video subsystem 103.

Figure 7:
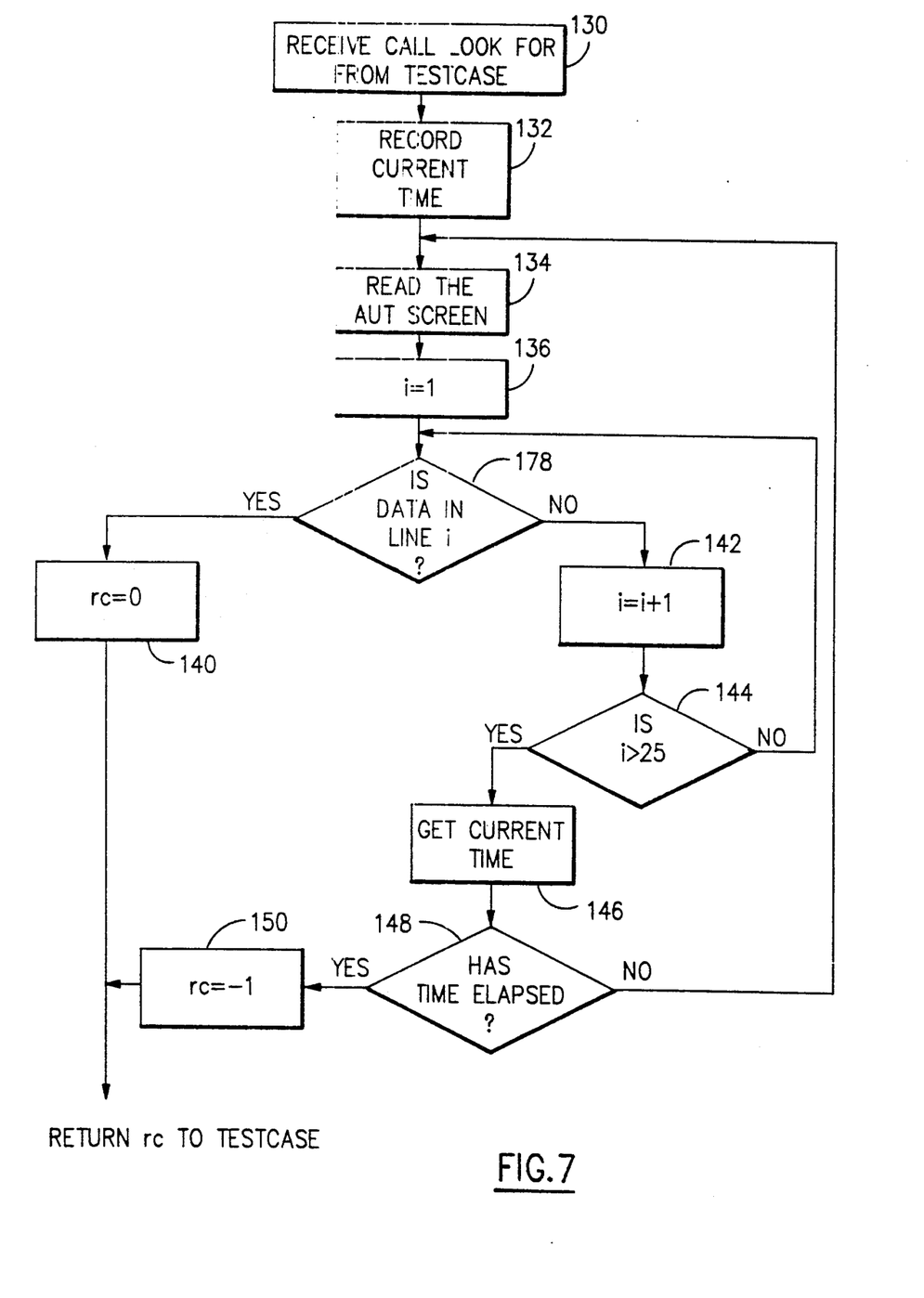
FIG. 7 is a flow chart of another portion of the test program of FIG. 4 which runs on the system of FIG. 1 and serves to analyze a display made by the application under test in response to processing by the keystroke.

Next, the test case 22 invokes the Call Lookfor or Read function of test program 34 (step 102) to direct test program 34 to compare the data actually written in logical video buffer 42 to the keystrokes that were transmitted to application 18 in response to the Call Keystroke step 100. As illustrated in FIG. 7, test program 34 receives the Lookfor call from test case 22 (step 130), and precedes to record the current time (step 132). Next, test program 34 directs communication program 36 to read the entire screen 43 (actually, logical video buffer 42) (step 134) generated by application 18 in response to the foregoing keystroke input. As described in more detail below, test program 34 will seek the character on any line on the screen 43 (actually logical video buffer 42), and if the test program finds the proper character on any line, will return a signal indicating that the test has proven valid. However, it should be noted that test case 22 could also be written to direct test program 34 to search for the proper character on a specific line or in a specific field, and return a valid signal only if the proper character is found on that line or in that field. In step 136, the test program 34 sets a line variable "i" equal to one, and then determines if the character is found in line 1 (decision block 138). If so, test program 34 returns a code of zero to the test case 22 (step 140) which interprets the return code as indicating a successful test (decision block 104 and step 106). However, if the character is not found on line 1, test program 34 searches the next line by incrementing the variable "i" (step 142) and repeating step 138 until either the character is found or the twenty fifth line has been tested (decision block 144). In the illustrated example, there are only 25 lines of text on the screen, and if unsuccessful tests have been made for lines 1-25, test program 34 reads the current time (step 146). If the predetermined test period which, in the illustrated example is two seconds, has not elapsed (step 148), the testing is repeated with step 138 for the twenty five lines as noted above. However, if the two second time has elapsed and the proper character is not found in any of the lines 1-25, then test program 34 sends a return code of negative 1 to test case 22 indicating an unsuccessful test. In response, test case 22 will direct the operating system to display an error message on screen 43 (decision block 104 and step 108).

Figure 8:
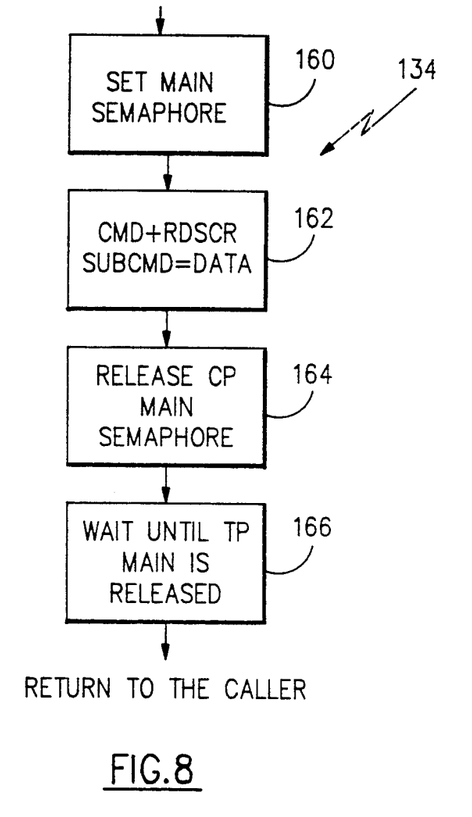
FIG. 8 is a flow chart which illustrates in detail a read screen step of FIG. 7.

Read screen step 134 is further detailed in FIG. 8, and works in conjunction with main thread 70 of communication programs 36 to transfer logical video buffer 42 to shared memory 41. First, test program 34 sets the main semaphore 56 of test program 34 (step 160), and then reads the "RDSCR" and "DATA" commands sent by test case 22 and makes them available for reading by main thread 70 of communication program 70 by writing them in the shared memory 57. Next, test program 34 releases a main semaphore 58 of communication program 36 (164), and then waits until the main semaphore 56 of test program 34 is released (step 166). Main thread 70 of communication program 30 waits until the communication program main semaphore is released (step 180 of FIG. 9), and then reads the command and subcommand made in step 162 (step 182). (FIG. 9 omits preliminary steps of initializing variables, invoking the character thread and keyboard thread, and creating shared memory 41.) In the illustrated example, the command is to read the screen so that step 182 leads to a decision block 186 via decision block 184. Because the subcommand is Data, decision block 186 leads to step 188 in which main thread 70 copies the logical video buffer 42 into shared memory 41. The Data subcommand indicates that communication program 70 should be concerned only with the data on this screen and not other attributes such as color.

However, if instead the subcommand from step 162 of FIG. 8 were either "All" or "Attributes", then decision block 186 would lead to step 190 in which main thread 70 would read data and attributes from logical video buffer 42 or just the attributes, respectively. After either step 188 or step 190, main thread 70 sets the communication program main semaphore (step 192), and then releases the test program main semaphore (step 194) to receive another command from test case 22 via program 34.

Figure 9:
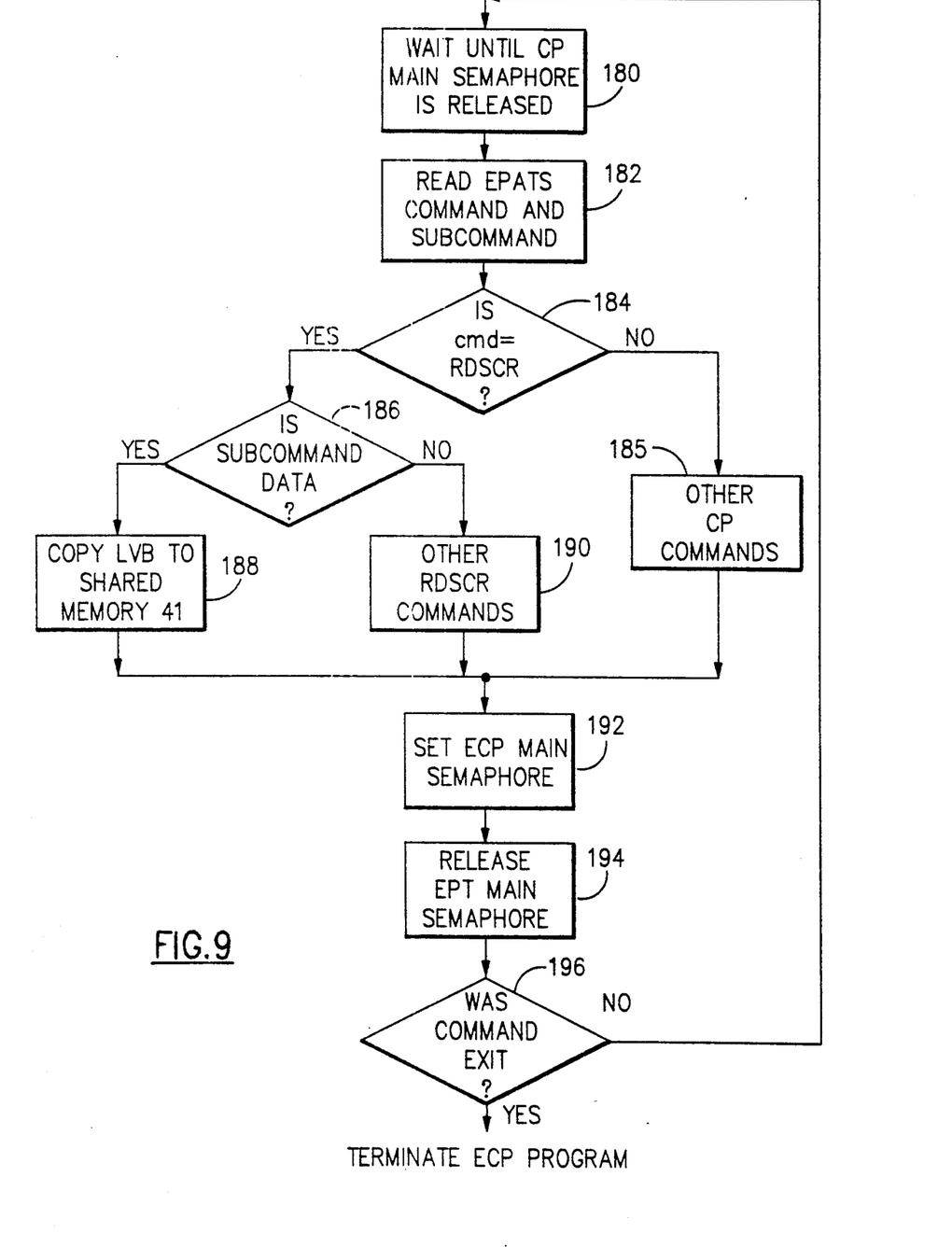
FIG. 9 is a flow chart of another portion of the communication program of FIG. 3 which transfers the application display data to shared memory for access and analysis by the test program.

To complete the description of FIG. 9, if instead of the illustrated example, the command from test program 34 was not "RDSCR" but some other command listed above, then main thread 70 would carry out the command in step 185 and proceed to step 192.

When main test program 34 allocates system resources such as memory, and semaphores for a test case, it uses a unique session SID of the test case for the resources so that the session SID is utilized throughout the system. The unique identification permits an automated function test reenter program that can be shared by other programs in a multi-tasking environment without corrupting the data in any one program. For every independent test that a user starts, the automatic function test program 34 allocates a data segment in 50 and a uniquely semaphore 56 and executes a new copy of communication program 36.

Figure 10:
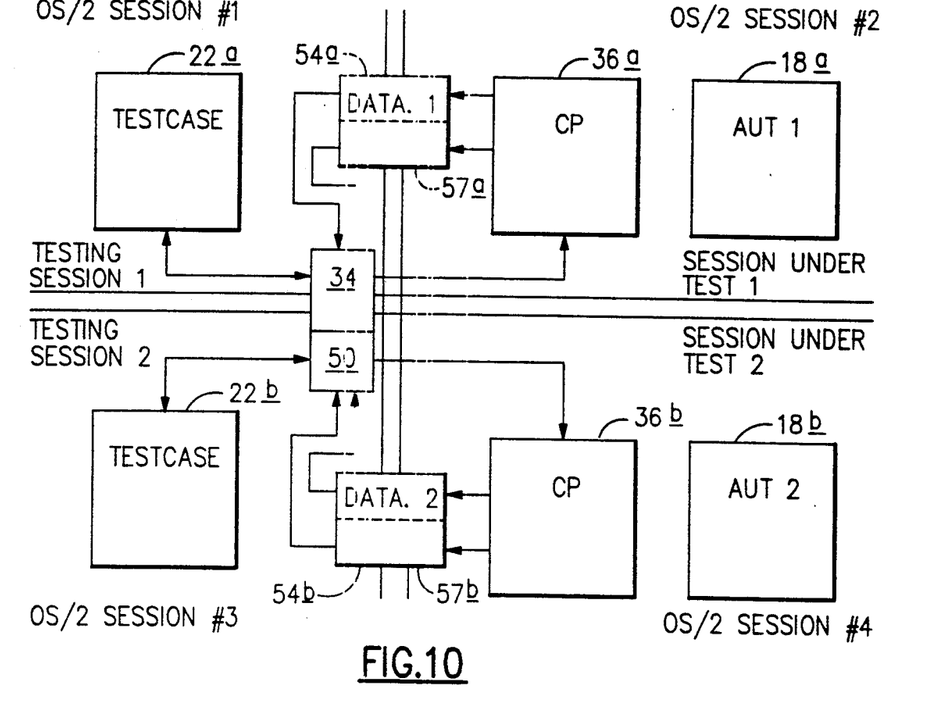
FIG. 10 is a block diagram illustrating operation of the test program of FIGS. 5 and 7 to concurrently run two test case programs and respective applications under test.

FIG. 10 illustrates the use of system 10 to run two test cases 22a and 22b and test program 34 during first and third sessions, and communication programs 36a and 36b and applications under test 18a and 18b during second and fourth sessions, respectively. The communication programs 36a and 36b operate as described above. FIG. 10 shows shared resources resulting from execution of two independent tests cases concurrently. Shared memories 41a and 41b are created for test cases 22a and 22b and applications 18a and 18b, respectively (portions 54a and 54b being shown in FIG. 10). The entire test program 34 is illustrated in FIG. 13 and operates during both the first and third sessions, to implement test cases 22a and 22b, respectively.

The test program 34 receives commands from either test case 22a or 22b, and executes them using the communication programs 36a or 36b, respectively. The test program is able to manage as many test cases as the operating system allows to execute concurrently. For each test case 22a and 22b, the test program 34 maintains a set of information in the global data segment 50 including the session identification (SID) of each test case as well as a pointer to its corresponding local data segment 54a or 54b.

Figure 13:
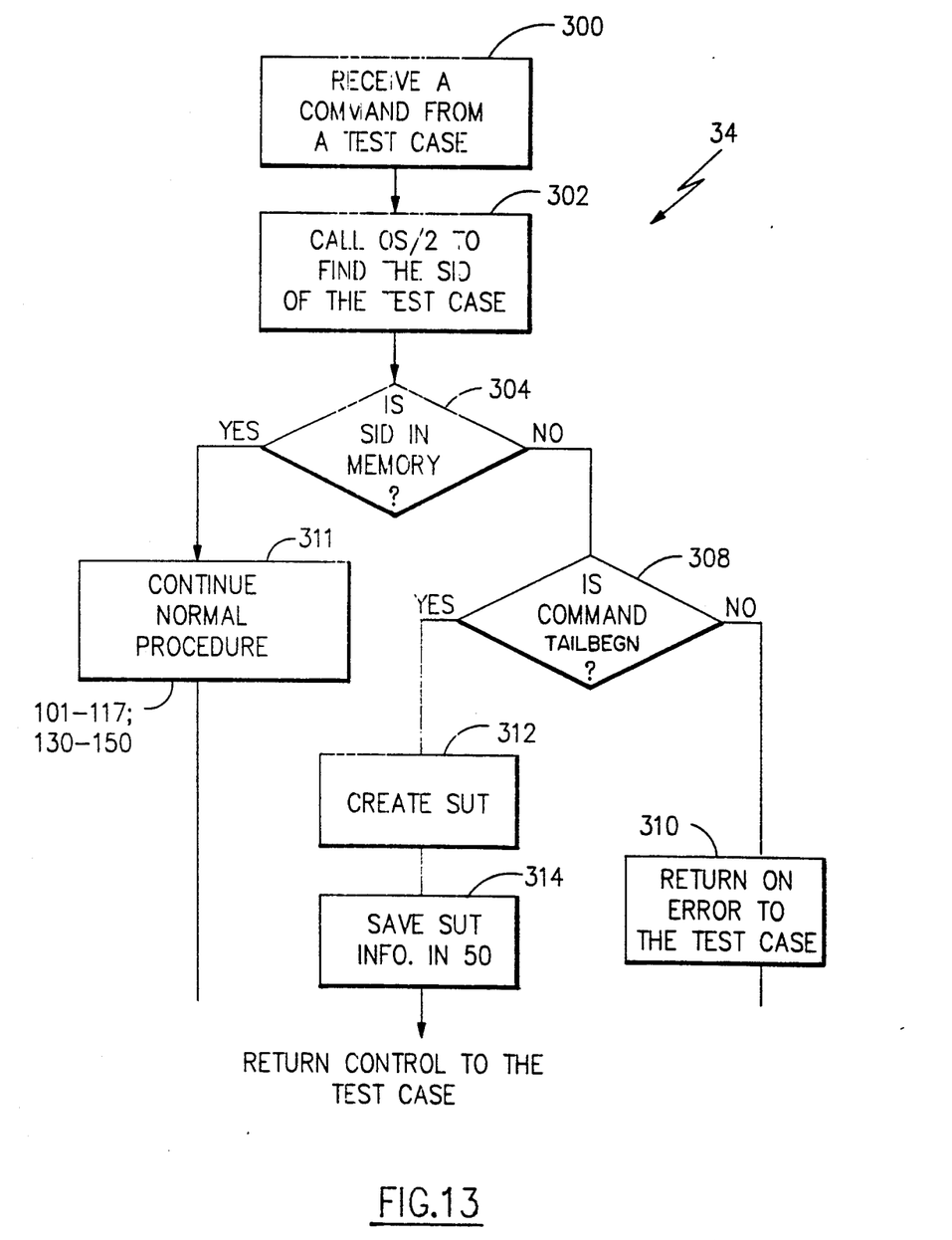
FIG. 13 is a flow chart which illustrates other steps of the main test program of FIGS. 5 and 7.

FIG. 13 further describes how the test program can associate a particular test case program with its corresponding application under test, in the illustrated example, test case 22a for application under test 18a and test case 22b for application under test 18b. Initially, test program 34 receives a command from test case 22a or 22b (step 300) and then calls the operating system (ex. OS/2 operating system) to determine the session SID of the caller test case (step 302). Test program 34 then determines if the SID is stored in the global segment 50 (decision block 304). If so, then the test program associates the caller test case with the session under test stored in the global segment 50, and proceeds according to steps 101-117 of FIG. 5 or steps 130-150 of FIG. 7, depending on the type of command.

If the SID is not found in the global segment then decision block 304 leads to step 300 in which the test program checks if the command is a TAILBEGN (decision block 308). If so, test program 34 creates a new session under test and executes the communications program 36 in that session (step 312). Next, test program 34 saves the test case information (SID, etc.) in the shared segment 50 and returns control to the test case (step 314). If the command is not a "TAILBEGN", then decision block 308 leads to step 310 in which the test program 34 returns an error signal to the test case 22a or 22b (step 310).

Figure 11:
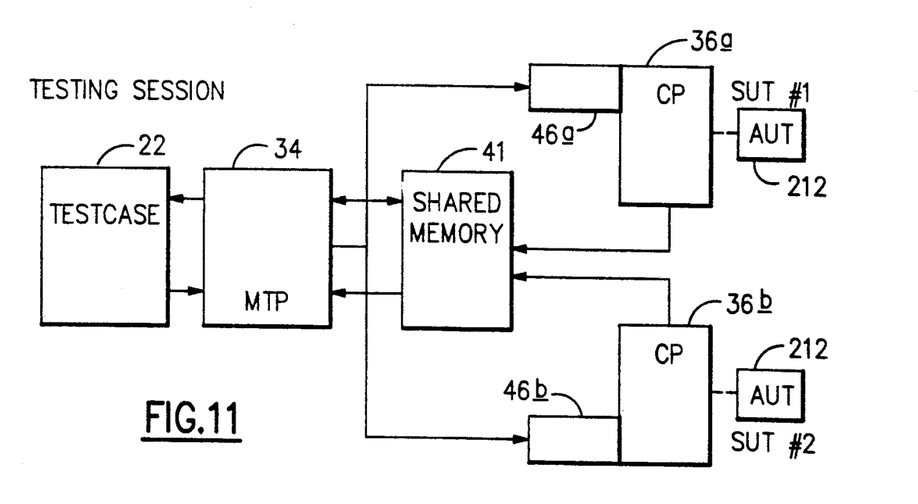
FIG. 11 is a block diagram illustrating operation of the test program of FIGS. 5 and 7 to concurrently test two applications with the same test case program.

Automated function test program 16 can also utilize a single test case 22 to selectively test more than one application program. Communication program 36 receives from automated function test program 16 during program load, the names of the shared memory and semaphores, to be used during the test. An automated function test program function "Open Next Session Under Test" is used to load additional copies of communication program 36 and give them unique names, 36a and 36b in FIG. 11, for their semaphores, 46a and 46b. Because automated function test program 16 specifies unique names for the system resources, more than one copy of communication program 36 a and b can be loaded into different sessions under test to execute more than one application program 18. To switch from one session under test to another session under test, test case program 22 executes the "Next Session Under Test" function as described above. Using this technique for testing plural application programs with one test case program, automated function test program 16 can do the following. For example, the system can be used to test main frame computer systems such as IBM 9370 systems. One application under test can be an IBM 3270 emulator used to communicate to a 9370 channel attached device, and another application 3270 emulator used to communicate with a support processor for the IBM 9370 system. In this example, the test case program 22 can exercise the channel attached device, via the first emulator running in one testing session, then switch to the next session in which the emulator that connects to support process runs, change some parameters of the support processor and then switch back to the channel attached device to change the same parameters during the test.

Figure 12:
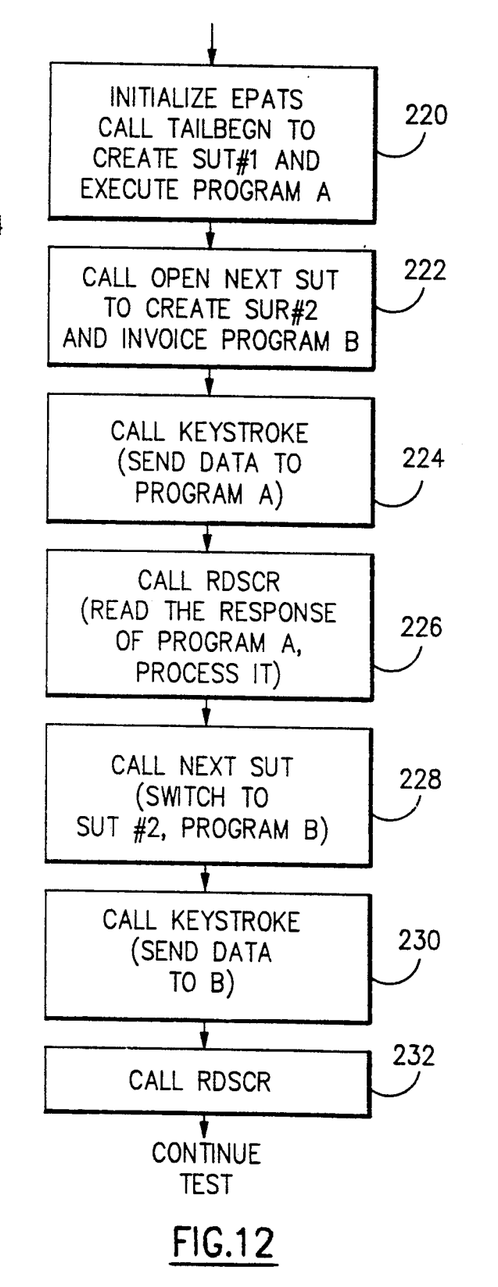
FIG. 12 is a flow chart which illustrates the operation of the components of FIG. 11 to concurrently test two application with the same test case program.

FIG. 12 illustrates in detail the operation of system 10 to use one test case program 22 to test two applications 210 and 212 concurrently. First, test program 34 is initialized and test program 34 creates session under test #1 (FIG. 11), loads a copy of communication program 36a, and executes application under test 210 (step 220). Then, test program 34 creates session under test #2 (FIG. 11), loads the copy of communication program 36b and invokes application under test 212 (step 222). Next, test case program 22 sends a "call keystroke" command and keystroke to test program 34 (step 224), the command and dates are stored in the data and are sent to application 210 in the second session via communication program 36a in the manner described above. Next, test case program 22 sends a "CALL RDSCR" command to test program 34 (step 226), and test program 34 obtaining the screen data from communication program 36a and makes the analysis in the manner described above. Then, test program 34 calls "Next SUT" to invoke communication program 36b (step 228), and "calls keystroke" to send a test keystroke to application under test 212 (step 230). Then, test program 34 sends a "CALL RDSCR" command to test program 34 (step 232), and test program 34 obtains the screen data from communication program 36b and makes the analysis in the manner described above.

Based on the foregoing, computer systems and programs embodying the present invention have been disclosed. However, numerous modifications and substitutions can be made without deviating from the scope of the invention. Therefore, the invention has been disclosed by way of illustration and not limitation, and reference should be made to the following claims to determine the scope of the invention.

We claim:

1. A computer system which executes and tests an application program that responds to input of an alphanumeric character by displaying a corresponding alphanumeric character(s) on a video screen and writing said corresponding alphanumeric character(s) into a video buffer, said computer system comprising:
   a processor;
   a multitasking operating system, executing on said processor, for controlling execution of the application program;
   means, residing in a first logical session, for receiving and storing a test case which specifies an alphanumeric character for input to said application program and a corresponding alphanumeric character(s) which said application program should display and write into a video buffer in response to said alphanumeric character input if said application program, processor and operating system are all functioning properly, said corresponding alphanumeric character of said test case being predicted based on assumed proper function of said application program, processor and operating system;
   a keyboard for receiving other, manual inputs of alphanumeric characters to said application program;
   a keyboard subsystem, responsive to manual input of an alphanumeric character, for generating an alphanumeric code which includes said alphanumeric character from said keyboard and is compatible with said operating system;
   a keyboard buffer, residing in a second logical session, for storing an alphanumeric code corresponding to the alphanumeric character input from said test case and storing the alphanumeric code from said keyboard subsystem;
   a video buffer, residing in said second session, for storing an alphanumeric character generated by said application program in response to said alphanumeric code which includes the alphanumeric character input of said said test case;
   a video screen for displaying said alphanumeric character generated by said application program in response to said alphanumeric code which includes the alphanumeric character input of said test case;
   a memory shared by said first and second sessions;
   first test program means, executing on said processor in said first session under control of said multitasking operating system and coupled to the storing means and said shared memory, for passing said alphanumeric character from said test case to said shared memory;
   second test program means, executing on said processor in said second session under control of said multitasking operating system and coupled to said shared memory, for generating the alphanumeric code which includes the alphanumeric character from said shared memory and is compatible with said operating system and writing said alphanumeric code into said keyboard buffer; and
   means for executing said application program in said second session and inputting said alphanumeric code from said keyboard buffer to said application program; and wherein said second test program means also fetches an alphanumeric character(s) from said video buffer generated and written by said application program after input of said alphanumeric code and writes said alphanumeric character(s) into said shared memory;
   said first test program means also compares said alphanumeric character(s) written by said application program in said shared memory to said corresponding alphanumeric character(s) specified in said test case that application program should have displayed and written into said video buffer to determine if said application program, processor and operating system are all functioning properly; and
   said first and second sessions are at least partially concurrent.

2. A computer system as set forth in claim 1 wherein:
   after the first test program means compares said alphanumeric character(s) written by said application program in said shared memory to said corresponding alphanumeric character(s) specified in said test case that the application program should have displayed and written into said video buffer, the receiving and storing means receives and stores another test case which specifies another alphanumeric character for input to said application program and specifies another corresponding alphanumeric character(s) which said application program should display and write in said video buffer in response to said other alphanumeric character input if said application program, processor and operating system are all functioning properly;
   the first test program means passes said other alphanumeric character input from said test case to said shared memory;
   the second test program means responds to said other alphanumeric character input by generating an alphanumeric code which includes this other alphanumeric character from said shared memory and is compatible with said operating system and writes said corresponding alphanumeric code into said keyboard buffer;
   the executing and inputting means inputs said corresponding alphanumeric code from said keyboard buffer to said application program;
   said second test program means also fetches an alphanumeric character(s) from said video buffer generated and written by said application program after input of said corresponding alphanumeric code and writes said alphanumeric character(s) into said shared memory; and
   said first test program means also compares said alphanumeric character(s) written by said application program in said shared memory to said corresponding alphanumeric character specified in said other test case that said application program should have displayed and written into said video buffer to determine if said application program, processor and operating system are all functioning properly, whereby said test cases are sequentially executed and combined in the storing means.

3. A computer system as set forth in claim 1 further comprising said test case stored in the storing means, said test case specifying said alphanumeric character for input to said application program and specifying said corresponding alphanumeric character(s) which said application program should display and write into said video buffer in response to said alphanumeric character input if said application program, processor and operating system are all functioning properly.

4. A computer system as set forth in claim 1 wherein said alphanumeric character input of said test case is the same as the alphanumeric character that said application program should display and write into said video buffer.

* * * * *